Sept. 11, 1962 A. E. BISHOP 3,052,912
STEER DAMPER
Filed April 19, 1957 4 Sheets-Sheet 1

INVENTOR
Arthur E. Bishop
By Hill, Sherman, Meroni, Gross & Simpson
Attorneys

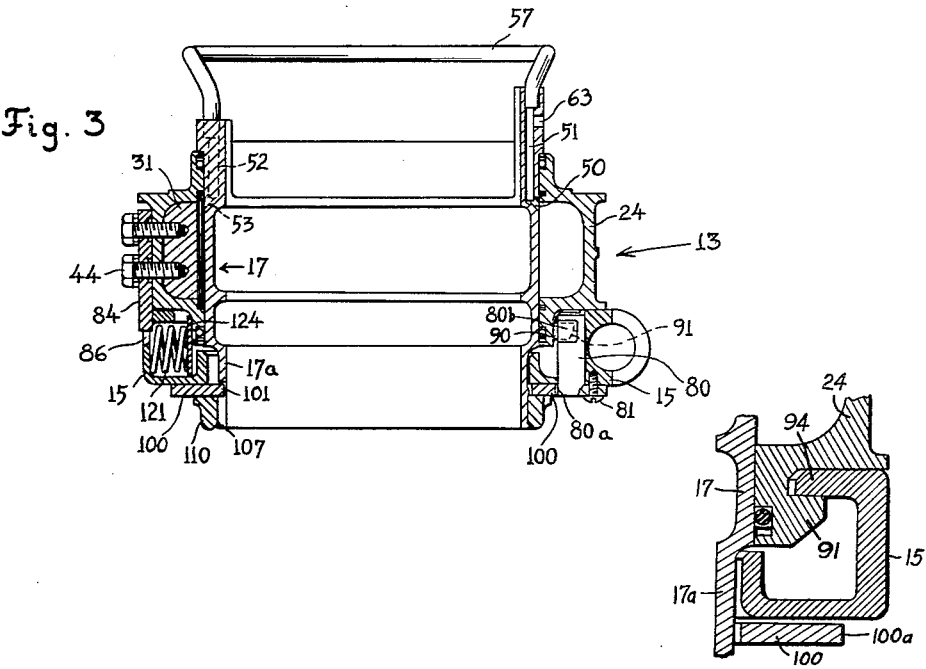

Sept. 11, 1962  A. E. BISHOP  3,052,912
STEER DAMPER
Filed April 19, 1957  4 Sheets-Sheet 3

INVENTOR:
Arthur E. Bishop
By Hill, Sherman, Merrin, Gross & Simpson
Attorneys

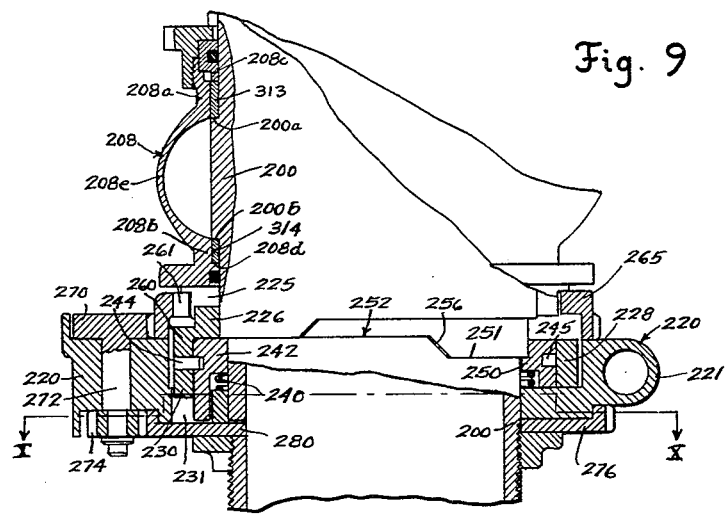
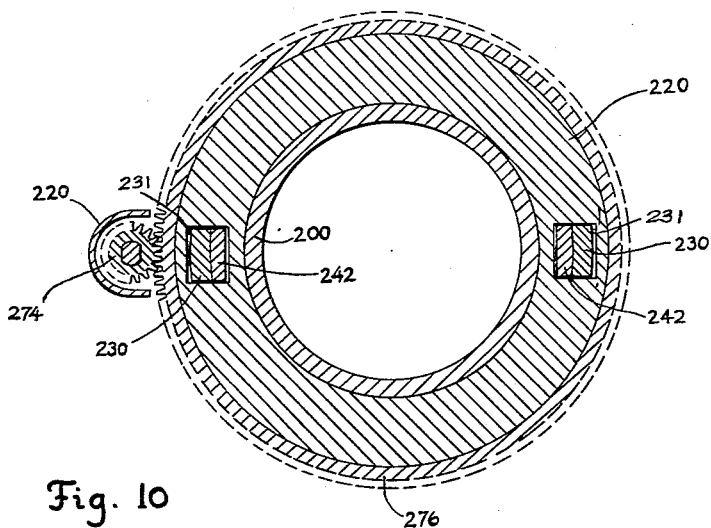

United States Patent Office  3,052,912
Patented Sept. 11, 1962

3,052,912
STEER DAMPER
Arthur E. Bishop, Detroit, Mich.
Filed Apr. 19, 1957, Ser. No. 653,964
4 Claims. (Cl. 16—35)

This invention relates to a control system and particularly to a steer-damper assembly for aircraft landing wheels and the like.

It is an important object of the present invention to provide a more compact steer-damper assembly for aircraft landing wheels and the like.

It is another object of the present invention to provide a steer damper system having a reduced number of parts and consequent reduced weight.

A further object of the present invention resides in the provision of a steer damper system having reduced static friction so as to minimize the torque required to initiate steering movements of the system.

Still another object of the present invention is to provide a steer damper system having appreciably increased angular range of operation.

A still further object of the present invention resides in the provision of a steer damper system having reduced backlash and lost motion.

Yet another object of the present invention resides in the provision of a steer damper system having a uniform damping or steering torque throughout the operating range thereof.

Another and further important object of the present invention is the provision of a steer damper assembly which can be made as a complete factory sealed and tested unit for installation and replacement as a unit in the field.

Still another and further object of the present invention is to provide a steer damper assembly which eliminates points of high load application and their attendant induced deflections.

Yet a further object of the present invention resides in the provision of a steer damper assembly having a working chamber structure of configuration to minimize internal leakage between working chambers.

A still further object of the present invention is to provide a steer damper system of structure to accommodate ready interchange of valving and the like associated therewith.

Other objects, features and advantages of the present invention will be more fully apparent from the following detailed description taken in connection with the accompanying drawings, in which:

FIGURE 3 is a vertical sectional view of the steer-damper unit of FIGURE 1;

FIGURE 4 is a bottom plan view of the structure of FIGURE 3;

FIGURE 5 is an enlarged fragmentary sectional view taken generally along the line 5—5 of FIGURE 4;

FIGURE 9 is a fragmentary vertical sectional view of a preferred embodiment of steer-damper in accordance with the present invention; and FIGURE 10 is a horizontal sectional view taken generally along the line 10—10 of FIGURE 9.

As shown on the drawings:

Figure 1:
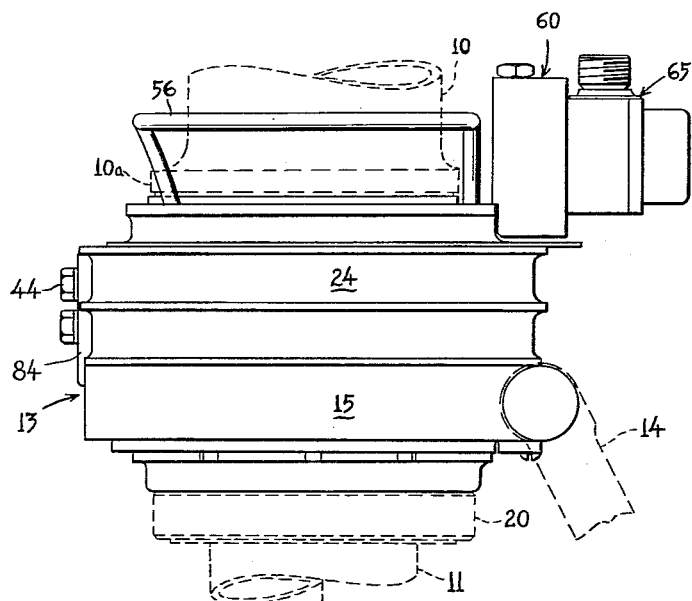
FIGURE 1 is a fragmentary elevational view illustrating the application of a steer-damper unit in accordance with the present invention to an aircraft.

FIGURES 1 to 8 illustrate a first embodiment of the present invention for assembly as a unit on a strut 10 of an aircraft. As will be understood by those skilled in the art, the strut 10 may be of a tubular construction to receive a shaft 11 carrying the wheel assembly 12. The steer damper system 13 of the present invention is coupled to the wheel assembly by means of a conventional scissors linkage, the upper part of which is indicated at 14 in FIGURE 1. The linkage 14 transmits angular movement of the wheel assembly directly to a torque transmitting member 15 of the control structure 13, while accommodating relative vertical movement between the wheel assembly and the control structure 13. Vertical movement of the wheel assembly including shaft 11 may be suitably controlled by means of a mechanism housed within the strut 10.

As best seen in FIGURE 3, the steer damper control structure 13 may comprise an inner sleeve member 17 which fits over a cylindrical part of the strut 10 and abuts against a shoulder 10a thereof as indicated in FIGURE 1. Suitable keying means (not shown) may be employed to prevent relative rotation between the sleeve 17 and the strut 10 while accommodating ready assembly of the sleeve 17 together with the remainder of the steer damper assembly on to the strut from the lower end thereof. A suitable clamping nut is indicated at 20 which threadedly engages the lower end of the strut 10 to retain the steer damper structure 13 in assembly against the shoulder 10a.

Figure 8:
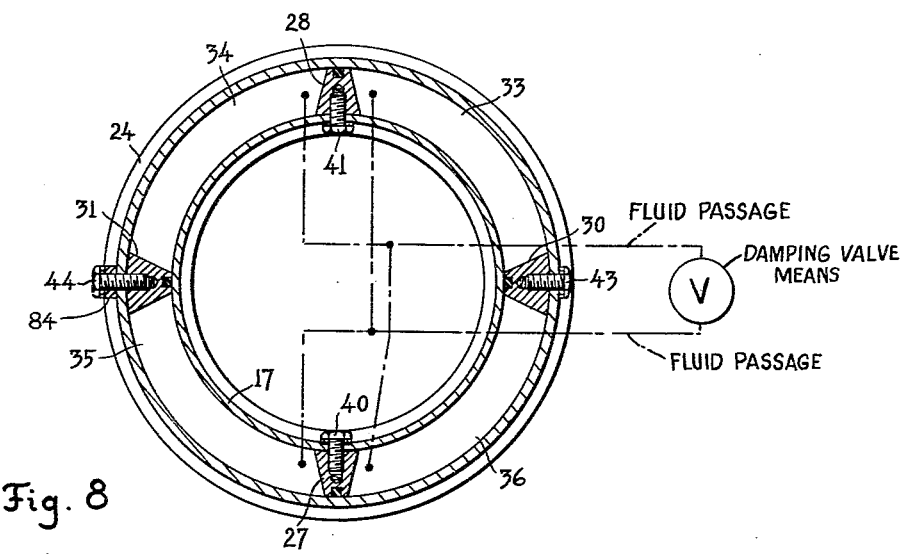
FIGURE 8 is a horizontal sectional view through the working chamber structure of the steer damper of FIGURE 1 and illustrating diagrammatically the fluid connections between the working chambers of the structure and the damping orifice valve.

Cooperating with the sleeve 17 to define working chambers of the structure is a reservoir collar 24 of generally toroidal configuration. As seen in FIGURE 8, fixed abutments 27 and 28 are secured to the sleeve 17 by suitable fastening means as indicated at 40 and 41 while movable vanes 30 and 31 are secured by fastening means 43 and 44 to the reservoir member 24 to define working chambers 33, 34, 35 and 36.

Figure 2:
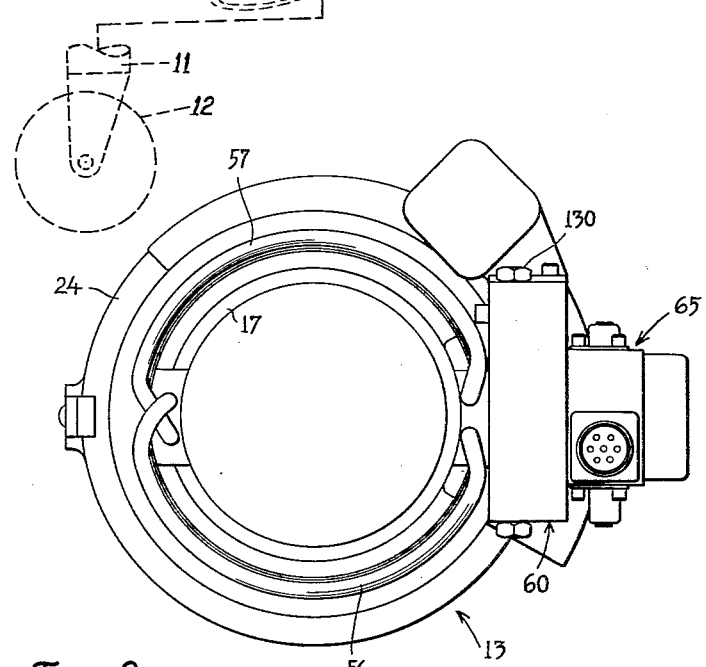
FIGURE 2 is a somewhat diagrammatic top plan view of the steer-damper unit of FIGURE 1.
Figure 6:
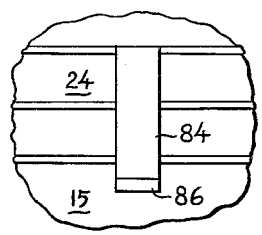
FIGURE 6 is a fragmentary enlarged elevational view of the key shown in section at the left in FIGURE 3.

Communication is established between diametrically opposite working chambers 33 and 35, and 34 and 36 by means of passages such as indicated at 50, 51, 52 and 53 in sleeve 17 as shown in FIGURE 3 and by means of external tubing such as indicated at 56 and 57 in FIGURES 1, 2 and 3.

Suitable valve means such as indicated at 60 in FIGURES 1 and 2 have damping orifice valves therein (not shown) communicating with the working chambers by means of passages such as indicated at 63 in FIGURE 3 to control interchange of fluid between the sets of opposite working chambers. By way of example, electric servo valve indicated at 65 may be provided for controlling the application of steering pressure to one set of diametrically opposite working chambers while relieving pressure from the opposite set of working chambers to control steering of the wheel assembly. It will be observed that the valving is mounted externally of the steer damper structure 13 so as to facilitate replacement thereof in case of valve failure.

Figure 7:
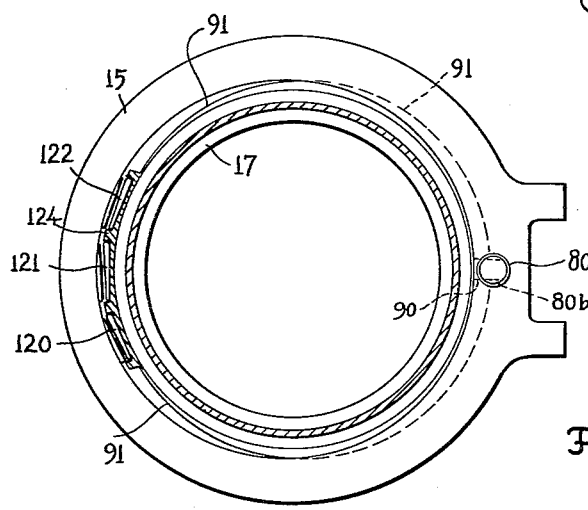
FIGURE 7 is a horizontal sectional view illustrating the torque ring in top plan.

By way of example, the system of the present invention may control movement of the wheel assembly through a range of 73 degrees on either side of a central position. For accommodating free swiveling of the wheel assembly outside of the operative range, means is provided for disconnecting the torque transmitting collar 15 from the reservoir collar 24 outside of the operating range. The coupling between the reservoir 24 and torque transmitting collar 15 comprises a pin 80 secured at one side of the torque ring 15 by means of a screw indicated at 81 in FIGURE 3, and key 84 secured to the reservoir member 24 by means of fastening means 44 and cooperating with a recess 86 at the opposite side of the torque ring 15, FIGURES 3 and 6. The pin 80 fits into a notch 90, FIGURE 7, in a flange 91, FIGURES 3 and 7, integral with the reservoir member 24. As seen in FIGURE 7, the flange 91 projects radially a maximum distance adjacent the notch 90 and gradually decreases in radial extent toward the opposite side of the reservoir. The pin 80 may be generally of circular cross section but have suitable flats such as indicated at 80b of spacing to fit in the notch 90.

As seen in FIGURE 5, the torque ring 15 is of a generally C-cross section and includes a flange 94 riding on top of the flange 91. The diameter of the torque ring 15 is substantially greater than the diameter of the portion 17a of sleeve 17 so as to accommodate radial shifting the torque ring 15 relative to the sleeve portion 17a. A cam ring 100 is mounted below the sleeve 17 as seen in FIGURE 3 and has lug portions such as 101, 102, 103 and 104, FIGURE 4, keyed in suitable longitudinal notches such as indicated at 107 in the sleeve portion 17a. A suitable nut 110 threads onto the lower end of the sleeve portion 17a to retain the cam plate 100 in predetermined relation to the remainder of the steer damper structure. A lower portion 80a of the pin 80 rides on the external periphery 100a of the cam 100 and is operative upon engagement with the cam steps 100b and 100c, FIGURE 4, to shift the torque ring 15 radially and thereby disengage the pin 80 from the notch 90, FIGURE 3, and disengage the key 84 from notch 86, FIGURES 3 and 6. The enlarged diameter portion 100d of the periphery of the cam plate 100 serves to maintain the torque ring 15 disengaged from the reservoir ring 24 during swiveling of the wheel assembly outside of the operative range of the steer damper structure. Thereafter, when the forward motion of the aircraft together with the wheel caster action drives the nose wheel to a position in the steering range, the lower portion 80a of the pin 80 travels past one of the steps 100b or 100c while an upper portion 80b of the pin rides on the external periphery of the reservoir flange 91. Spring means 120, 121 and 122 acting on torque ring 15 and backed by a pressure plate 124 press the torque ring 15 toward the radial position illustrated in FIGURE 3, so that when the pin 80 comes into alignment with the notch 90, the springs automatically snap the pin 80 into the notch to again interlock the reservoir member 24 with the torque ring 15.

It is found that the illustrated construction appreciably reduces clearance requirements between the strut and other components and mechanisms which are operated and housed in the nose gear well of an aircraft. The elimination of the conventional torque collar and damper attachment lugs permits a sizable weight reduction in the steer damper system. Because of the balanced arrangement of the vane construction about the center line of the strut and the large diameter bearing surfaces, static torque required to initiate steering movements is minimized to reduce power requirements and thus further reduce the size and weight of the unit. Further, since the operating range of the system is governed by the size of the various parts of the damper structure which may be reduced in view of the reduced power requirements, the operating range of the structure is increased. Elimination of attachment lugs, transmission levers, and separate torque collar reduces system backlash and lost motion by the amount previously required for necessary operating clearances and manufacturing tolerances. This reduction in backlash and lost motion enables control of shimmy to a higher degree, reduces the damper strength requirements, and permits more accurate wheel positioning during steering and towing operations. The direct coupling of the torque collar to the damping mechanism permits development of uniform effective lever ratio, and consequently a uniform torque, throughout the full steering and damping range.

The embodiment as illustrated in FIGURES 1 to 8 can readily be made as a complete factory sealed and tested unit. It is possible to seal the unit in such a manner as to prevent unauthorized field adjustments after factory tests. Further, use of the present structure eliminates points of high load application and their attendant induced deflections. This affords an opportunity to reduce strut weight in regions previously designed to withstand the purely local effects imposed by steer damper attachment lugs and levers. When a smaller steering angle is specified, the unit can be readily converted to a three or four vane unit to obtain large increases in output torque. Due to the toroidal shape of the working chambers, minimum deflections and sealing perimeters are provided. Consequently, minimum variation of output torque and internal leakage are inherent characteristics of the present structure. External valving may be gasket mounted to the steer damper structure to facilitate application of any desired valving system—mechanical, electro-hydraulic, or full hydraulic servo. Air bleeding may be accomplished by cracking a bleed plug on the side of the valve body 60, the plug being indicated at 130 in FIGURE 2. Thus plug vents a chamber in the return line which is located at the highest point in the unit.

FIGURES 9 and 10 illustrate a modified steer damper construction incorporating automatic positioning of the steer damper with respect to the wheel assembly as the wheel assembly moves outside the operative range so as to insure immediate recoupling of the steer damper with the wheel assembly as the wheel assembly returns to the operative range.

In this embodiment as best seen in FIGURE 9, a sleeve 200 is to be assembled on a strut similar to that indicated at 10 in FIGURE 1 and carries fixed abutments similar to those shown at 27 and 28 in FIGURE 8 cooperating with movable vanes of a toroidal reservoir member 208 to define working chambers in the same manner as illustrated in FIGURE 8.

In the operative range of the mechanism, the reservoir member 208 is coupled directly to a torque ring 220 which has integral lugs such as 221 for coupling of ring 220 to the wheel assembly through a scissors linkage. The reservoir member 208 has a notch 225 which is adapted to receive a first key 226 on a shuttle ring 228. The shuttle ring in the axial position shown has a second key 230 engaged in a notch 231 in torque ring 220.

Spring means 240 encircling sleeve or wingshaft 200 is disposed between torque ring 200 and a cam follower ring 242 which in turn is axially coupled by means of pins such as 244 riding in annular groove 245 to shuttle ring 228 to urge the shuttle ring in the axial direction.

In the operative range of the structure, the cam follower ring 242 is restrained from axial movement by engagement of a follower lug 250 thereon with a lower portion 251 of a cam ledge 252 carried integrally with the wingshaft 200. As the torque ring 220 moves out of the operative range, the follower lug 250 travels on the angular portion 256 of the cam ledge 252 to allow spring 240 to shift key 230 out of engagement with notch 231 in torque ring 220 to allow free swiveling of the torque ring 220 with the wheel assembly.

Shifting of shuttle ring 228 with cam follower ring 242 also causes key 226 to move into notch 225 and causes a third key 260 provided by shuttle ring 228 to engage in a notch 261 of a repositioning gear 265. The repositioning gear is now rigidly keyed to the reservoir member 208 by shuttle ring 228. The repositioning gear is constantly in mesh with a repositioning pinion gear 270. Pinion 270 is on a shaft 272 journaled on torque ring 220. As the torque ring rotates, shaft 272 and pinion 270 are rotated by means of pinion 274 on shaft 272 meshing with fixed gear ring 276 which is keyed to wingshaft 200 as indicated at 280. Thus as the torque ring 220 rotates in one direction pinion 270 is effective to move the repositioning gear 265 in the opposite direction. The gearing is so arranged that the reservoir member 208 is immediately coupled to the torque ring 220 as soon as the torque ring moves into the operative range of the steer damper.

FIGURE 9 illustrates a preferred form of working chamber structure in accordance with the present invention and which may be applied to either of the illustrated embodiments.

The structure comprises the sleeve member 200 and the reservoir member 208 of solid continuous annular construction as in the embodiment of FIGURES 1–8. The reservoir member 208 is journalled on the sleeve member 200 by means of bearing rings 313 and 314 which seat against axial shoulders 200a and 200b of the sleeve member. Annular marginal portions 208a and 208b of the reservoir member bear against the bearing rings 313 and 314 respectively and have shoulder portions 208c and 208d bearing against the axially outer ends of the respective bearing rings 313 and 314.

In accordance with the present invention, the reservoir member 208 is so constructed that as pressures of the order of 2000 to 3000 p.s.i. build up during operation of the structure in the damping mode, the radial wall 208e of the reservoir member tends to progressively bulge outwardly with increasing pressure to draw shoulders 208c and 208d axially inwardly and thus to progressively axially compress bearing rings 313 and 314 against sleeve shoulders 200a and 200b. Thus as pressure progressively increases in the damping mode, the reservoir chamber automatically prevents leakage by correspondingly increasing an axial sealing pressure on the bearing rings 313 and 314.

The manner in which lugs 221 of ring 220 may be coupled to the wheel assembly of an aircraft and the connection of the working chambers of reservoir member 208 to suitable damping orifice valves may be the same as described in connection with FIGURE 1. Since the damping valve arrangement of FIGURES 9 and 10 may be substantially identical to that shown in FIGURE 8, no further showing of this arrangement is deemed necessary. Thus, as the wheel assembly tends to vibrate during operation of the aircraft, the damping orifice valves will restrict the interchange of fluid between the working chambers of the reservoir member 208, giving rise to the pressures above referred to in the working chambers.

For enhancing this sealing effect of the reservoir member 208, the radial wall portion 208e thereof is preferably of reduced thickness in comparison with the thickness of the marginal portions 208a and 208b so as to bulge to the desired degree at extreme damping pressures, for example in the range from 2000 to 3000 pounds per square inch in the active working chambers. Beside the sealing effect afforded by radial bulging or deflection of wall 208e at extreme pressures, the progressive radial pressure on bearing rings 313 and 314 with increasing pressure build-up in the active working chambers in the damping mode has the effect of increasing bearing friction and thus providing an additional damping force which increases with increasing shimmy forces exerted on the structure.

It will be apparent that many modifications and variations may be effected without departing from the scope of the novel concepts of the present invention.

I claim as my invention:

1. In a fluid control structure for assembly as a unit on a fixed strut of an aircraft landing gear having a wheel carrying member rotatably secured thereto, an annular sleeve member generally symmetrical with respect to a central axis for mounting in fixed relation to said strut with its central axis aligned with the axis of said strut, fixed abutments secured to the external periphery of said sleeve member, a one piece toroidal reservoir member of continuous annular cross section and generally symmetrical with respect to a central axis encircling said sleeve member and defining therewith a fluid tight annular space, vane elements carried by said reservoir member and projecting into said annular space to define with said fixed abutments working chambers for controlling movement of said reservoir member relative to said sleeve member, means accommodating coupling of said reservoir member to said wheel carrying member for conjoint movement therewith within the range of angular movement of said reservoir member, a torque ring for coupling to said wheel carrying member for conjoint movement therewith and having means for coupling said torque ring to said reservoir member for conjoint movement therewith in the range of movement of said reservoir member, and repositioning means for coupling the torque ring to said reservoir member for opposite angular movement of the reservoir member relative to the torque ring as the torque ring moves outside the operative range of said reservoir member, said repositioning means providing for automatic re-engagement of the torque ring and reservoir member as soon as the torque ring returns to the operative range of the reservoir member.

2. In a fluid control structure for assembly as a unit on a fixed strut of an aircraft landing gear having a wheel carrying member rotatably secured thereto, an annular sleeve member generally symmetrical with respect to a central axis for mounting in fixed relation to said strut with its central axis aligned with the axis of said strut, fixed abutments secured to the external periphery of said sleeve member, a one piece toroidal reservoir member of continuous annular cross section and generally symmetrical with respect to a central axis encircling said sleeve member and defining therewith a fluid tight annular space, vane elements carried by said reservoir member and projecting into said annular space to define with said fixed abutments working chambers for controlling movement of said reservoir member relative to said sleeve member, means accommodating coupling of said reservoir member to said wheel carrying member for conjoint movement therewith within the range of angular movement of said reservoir member, a torque ring for coupling to said wheel carrying member for conjoint movement therewith and having means for coupling said torque ring to said reservoir member for conjoint movement therewith in the range of movement of said reservoir member, and repositioning means for coupling the torque ring to said reservoir member for opposite angular movement of the reservoir member relative to the torque ring as the torque ring moves outside the operative range of said reservoir member, said repositioning means providing for automatic re-engagement of the torque ring and reservoir member as soon as the torque ring returns to the operative range of the reservoir member, said repositioning means comprising a fixed annular gear secured to said sleeve member, pinion gear means mounted on said torque ring and meshing with said fixed gear, second annular gear means driven by said pinion gear means, and means for coupling said second annular gear means to said reservoir member upon movement of said torque ring outside of the operative range of said reservoir member.

3. In a fluid control structure, relatively fixed means providing a cylindrical external wall portion and providing bearing surfaces at opposite axial sides of said cylindrical wall portion, a one piece reservoir member of ring configuration encircling said cylindrical wall portion and journalled on said bearing surfaces for rotation about the central axis of said cylindrical wall portion, said reservoir member having a generally C cross section to provide an annular space interiorly thereof surrounding said cylindrical wall portion of said relatively fixed means, vane elements carried by said reservoir member and projecting radially into said annular space, fixed abutments carried by said relatively fixed means and projecting into said annular space from said cylindrical wall portion to define with said vane elements working chambers for controlling movement of said reservoir member relative to said relatively fixed means, a torque transmitting member of ring configuration encircling said relatively fixed means axially adjacent said reservoir member for rotary movement on said relatively fixed means, keying means between said torque transmitting member and said reservoir member for coupling said members for conjoint movement in a range of angular movement of said torque transmitting member, said keying means being disengageable in response to radial shifting of said torque transmitting member relative to said relatively fixed means, and cam means on said relatively fixed means for shifting said torque transmitting member radially to disengage said keying means as said torque transmitting member moves outside said range of angular positions.

4. In a fluid control structure, relatively fixed means providing a cylindrical external wall portion and providing bearing surfaces at opposite axial sides of said cylindrical wall portion, a one piece reservoir member of ring configuration encircling said cylindrical wall portion and journalled on said bearing surfaces for rotation about the central axis of said cylindrical wall portion, said reservoir member having a generally C cross section to provide an annular space interiorly thereof surrounding said cylindrical wall portion of said relatively fixed means, vane elements carried by said reservoir member and projecting radially into said annular space, fixed abutments carried by said relatively fixed means and projecting into said annular space from said cylindrical wall portion to define with said vane elements working chambers for controlling movement of said reservoir member relative to said relatively fixed means, a torque transmitting member of ring configuration on said relatively fixed member axially adjacent said reservoir member for rotation on said relatively fixed means, keying means between said torque transmitting member and said reservoir member for coupling said members for conjoint movement in a given range of angular positions of said torque transmitting member, means for disengaging said keying means in response to said torque transmitting member travelling outside said range of angular positions, fixed annular gear means secured to said relatively fixed means adjacent said torque transmitting member, and gear means on said torque transmitting member for coupling with said fixed annular gear means and with said reservoir member to drive said reservoir member in an opposite angular direction from said torque transmitting member when the torque transmitting member is travelling outside of said range of angular positions and to drive said reservoir member to a position for re-engagement of said keying means whenever the torque transmitting member returns to said range of angular positions.

References Cited in the file of this patent
UNITED STATES PATENTS

| | | |
|---|---|---|
| 2,198,763 | Draminsky | Apr. 30, 1940 |
| 2,270,668 | Davis | Jan. 20, 1942 |
| 2,275,371 | Magrum | Mar. 3, 1942 |
| 2,275,372 | Magrum | Mar. 3, 1942 |
| 2,284,148 | Hineman | May 26, 1942 |
| 2,291,571 | Cleveland | July 28, 1942 |
| 2,372,710 | Chisholm | Apr. 3, 1945 |
| 2,383,773 | Chisholm | Aug. 28, 1945 |
| 2,572,589 | Bishop | Oct. 23, 1951 |
| 2,661,917 | O'Connor et al. | Dec. 8, 1953 |
| 2,717,138 | Sheehan | Sept. 6, 1955 |
| 2,770,832 | Martin | Nov. 20, 1956 |